Patented Feb. 6, 1940

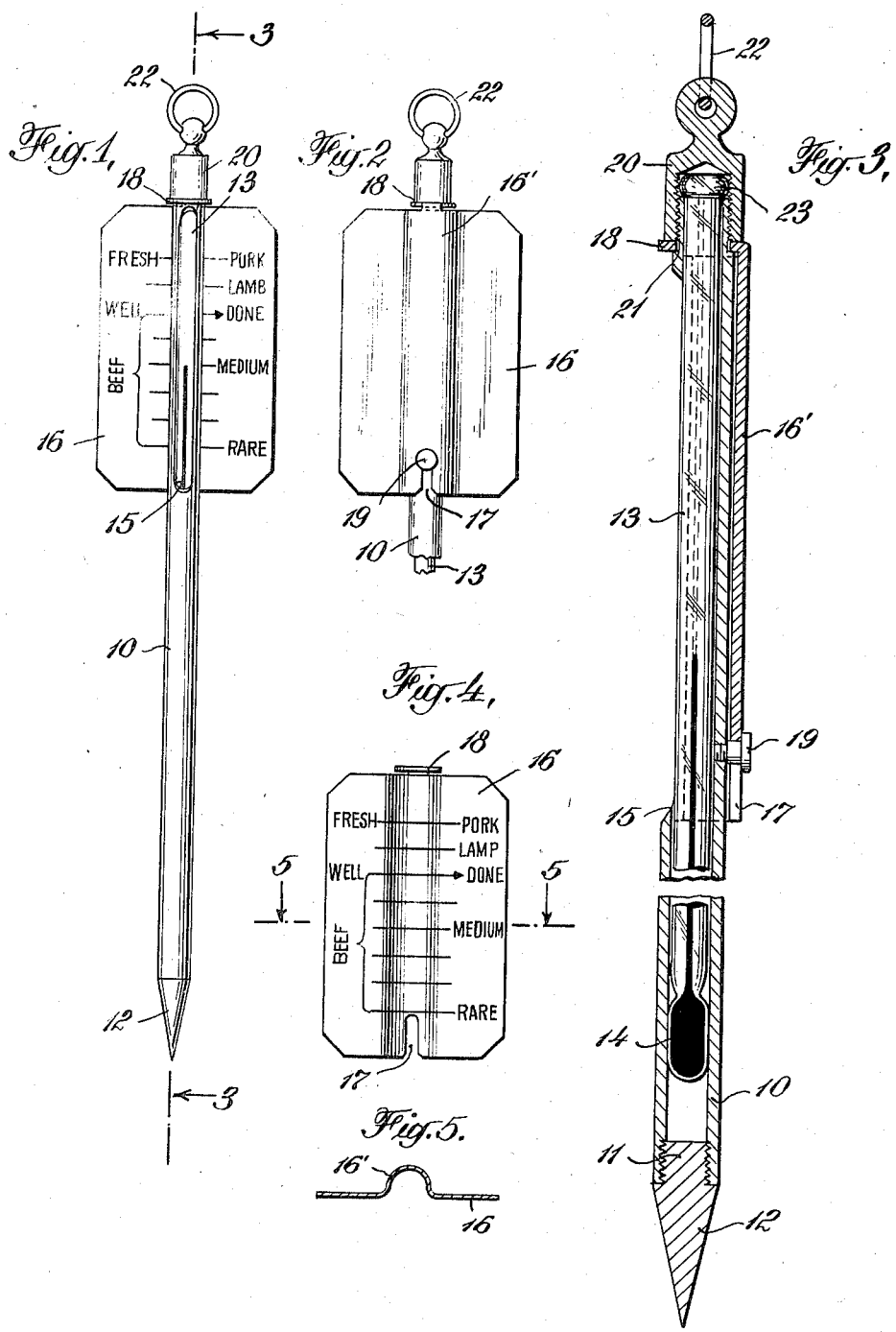

2,189,123

UNITED STATES PATENT OFFICE 2,189,123

THERMOMETER

Howard H. Barker, South Orange, N. J., assignor to Weksler Thermometer Corporation Application March 3, 1937, Serial No. 128,706

3 Claims. (Cl. 73—352)

This invention relates to thermometers of the type used for recording the cooking temperature of roasts of meat or the like and commonly known as "roast meters". More particularly, the invention is concerned with a novel roast meter of durable construction which may be more readily applied to the roast or other object to be cooked than roast meters as devised heretofore.

Roast meters as commonly made include a thermometer in the form of an elongated tube of glass having a capillary bore terminating in a bulb at one end of the tube. The bulb is filled with a liquid, such as alcohol, which indicates the degree of heat of the bulb by the level of the liquid column in the bore, as shown by a graduated scale. The scale is generally arranged either on a panel fixed to the tube or directly on the tube itself. When a roast of meat or the like is to be cooked, the bulb end of the thermometer tube is inserted in the meat with the scale end exposed, so that the temperature of the inside of the meat may be read on the scale.

Devices of this construction are open to several objections, the most serious of which is the difficulty encountered in inserting the thermometer into the meat. The bulb end of the glass tube is generally formed with a point so that the tube may be forced into the meat more readily, but even with a pointed bulb considerable force is required to insert the tube into a large roast. If too much force is applied to the tube, however, there is danger that it will break. Also, if a bone is encountered the point of the bulb may break, thereby rendering the roast meter useless and possibly contaminating the meat with the contents of the bulb.

Another objectionable feature of roast meters as devised heretofore is the arrangement of the scale for reading the temperature. In devices in which the scale is marked on the thermometer tube itself, the scale can be read only with difficulty due to the limited size of the graduations. On the other hand, when the scale is marked on a panel fixed to the tube, the device does not lend itself to easy cleaning. During the cooking of roasts, juice from the meat often spatters on the panel and hardens behind the thermometer tube where it is inaccessible.

The present invention is directed to the provision of a novel roast meter which may be readily inserted into a roast of meat or the like without danger of breaking the thermometer. In addition, the new roast meter in its preferred form may be quickly and easily disassembled to facilitate cleaning of the member on which the scale is marked.

A roast meter constructed in accordance with the present invention comprises a tubular casing made of metal or other heat-conducting material and provided at one end with a skewer point. Within the casing is a thermometer which is in closely contacting engagement with the inner wall of the casing near the skewer point. Preferably, the thermometer is of the common liquid type with the bulb disposed near the pointed end of the casing, and a portion of the capillary tube is exposed through a longitudinal slot in the casing near the opposite end thereof. A scale is arranged near the slot in the casing by which the level of the liquid column of the thermometer tube may be read in terms of degrees in temperature or the like. The scale is preferably arranged on a panel mounted on the metallic casing and removable therefrom. In the preferred form of the new device, the thermometer and the skewer point are likewise removable from the casing.

It will be apparent that with the new construction, the glass tube of the thermometer is protected from breakage by the metallic casing which surrounds it. The pointed end of the casing may be readily inserted into a roast of meat by application of the necessary force and without danger of breaking the thermometer. By reason of the metallic skewer point at the end of the casing, the encountering of a bone or other obstruction in the meat will not result in damage to the device. When the pointed end of the casing is inserted in the meat, the heat from the meat is conducted by the metallic casing to the glass bulb of the thermometer, and the level of the liquid column in the thermometer will rise to a position where it may be viewed through the slot in the casing and read on the scale. The panel and thermometer tube may be quickly removed from the casing to facilitate cleaning of the device. Since the roast meter may be readily disassembled, the parts thereof may be easily replaced if for any reason such replacement should be necessary.

For a more complete understanding of the invention, reference may be had to the accompanying drawing, in which:

Figure 1 is a front view of one form of the new roast meter;

Figure 2 is a rear view of the upper part of the device shown in Fig. 1;

Figure 3 is an enlarged longitudinal section on the line 3—3 of Fig. 1, with part of the device broken away;

Figure 4 is a front view of the panel of the device shown in Fig. 1; and

Figure 5 is a section on the line 5—5 of Fig. 4.

In the drawing, the numeral 10 indicates a hollow cylindrical casing made of a heat-conducing material, preferably metal. The lower end of the casing 10 is internally threaded to receive the threaded shank 11 of a skewer point 12. The skewer point is likewise of metal and is formed to fit closely against the lower end of casing 10. Mounted in the casing 10 and removable therefrom is a glass thermometer 13 of the common liquid type. Preferably, the outside diameter of the glass tube of the thermometer is slightly less than the inside diameter of the casing 10, and the bulb 14 of the thermometer has substantially the same diameter as the inside of the casing so that it closely engages the inner wall of the casing near the skewer point 12, as shown in Fig. 3.

The casing 10 near its upper end is provided in front with a longitudinal slot 15 which exposes the upper portion of the capillary bore in the thermometer 13. A panel 16, preferably of metal, is mounted on the back of casing 10 behind the longitudinal slot 15 and is marked with graduations and suitable indicia to indicate the required cooking temperature for various kinds of meat, as shown in Figs. 1 and 4. As shown particularly in Figs. 4 and 5, the panel 16 is bent along the center line thereof to form a substantially semi-circular section 16' conforming to the contour of the back of casing 10. The panel is removably secured to the casing with the curved section 16' in engagement with the back thereof, and to this end I provide the panel at the bottom with an upwardly extending central slot 17 and at the top with an integral ear 18 which extends forwardly from the back of the curved portion 16'. When the panel 16 is mounted on the casing, the upper end of the casing extends through an opening in the ear 18, and the lower end of the panel is held against the casing by the head of a pin 19 which is fixed on the casing and disposed in the slot 17. An end cap 20 threaded on the upper end of the casing holds the ear 18 of the panel in engagement with a shoulder 21 on the casing and thereby prevents upward movement of the panel on the casing. Preferably, the cap 20 near the top is provided with a tranverse opening through which extends a ring 22 for suspending the device on a hook or the like when the device is not in use.

It will be observed that in the new roast meter, the thermometer 13 is housed in the casing 10 which protects the thermometer against breakage. The pointed end of the casing 10 may be readily inserted into a roast of meat or the like without danger of breaking the thermometer or the skewer point. When the pointed end of the device is lodged in the meat, the heat from the meat is conducted through the metallic casing to the bulb 14 of the thermometer. Accordingly, the liquid column in the capillary bore of the thermometer will rise to a level commensurate with the temperature of the meat. When the level of the liquid column in the thermometer has risen sufficiently, it may be viewed through the opening 15 in the casing and compared with the scale on panel 16.

When the device is to be cleaned, the end cap 20 is unscrewed from the upper end of the casing and the panel 16 removed by sliding it upwardly over the top of the casing, so that pin 19 is withdrawn from the slot 17 and the threaded upper end of the casing is withdrawn from the opening in the ear 18. The thermometer 13 may be drawn out of the casing from the top, and preferably the upper end of the thermometer is formed with an enlargement 23 so that it may be more readily grasped in removing it from the casing. It will be apparent that if the skewer point 12 should in any way become damaged, it may be readily replaced by unscrewing it from the lower end of the casing and inserting another point.

I claim:

1. A temperature indicating device comprising an elongated casing, a thermometer in the casing contacting the inner wall of the casing near one end thereof, the casing having an opening in its side wall near the opposite end for exposing at least a portion of the indicating means of the thermometer, a pin projecting from the side wall of said casing intermediate the ends thereof, an indicia bearing plate mounted on the casing near said opening and having a slot extending upwardly from its lower end in which said pin is engaged, a lateral projection on the upper end of the plate having an opening through which the upper end of the casing extends, and a removable member mounted on the upper end of the casing in engagement with the upper surface of said projection.

2. A temperature indicating device comprising an elongated casing, a thermometer in the casing contacting the inner wall of the casing near one end thereof and removable from the opposite end of the casing, the casing having a shoulder near said opposite end and an opening in its side wall near said opposite end for exposing at least a portion of the indicating means of the thermometer, a panel removably mounted on the casing having a scale marked thereon, said panel including a portion substantially surrounding the casing to hold the panel in position thereon, and a cap removably mounted on said opposite end of the casing for securing the thermometer against removal therefrom and for clamping said portion of the panel against the shoulder.

3. A temperature indicating device comprising an elongated casing, a thermometer in the casing contacting the inner wall of the casing near one end thereof and having indicating means visible through an opening in the casing, a panel removably mounted on the casing and having a scale marked thereon and a slot extending upwardly from the lower end of the panel, and a headed pin on the casing intermediate its ends engaged in the slot to secure the panel to the casing in a predetermined position relative to said opening, the panel being movable upwardly along the casing to withdraw the pin from the slot.

HOWARD H. BARKER.